United States Patent
Isono et al.

(10) Patent No.: US 7,036,731 B2
(45) Date of Patent: May 2, 2006

(54) READING METHOD FOR DATA IN CARD READER AND CARD READER UTILIZING THE SAME

(75) Inventors: Yoichi Isono, Nagano (JP); Shigeki Ozawa, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 50 days.

(21) Appl. No.: 10/859,677

(22) Filed: Jun. 2, 2004

(65) Prior Publication Data

US 2005/0023349 A1 Feb. 3, 2005

(30) Foreign Application Priority Data

Jun. 3, 2003 (JP) .............................. 2003-158582

(51) Int. Cl.
*G06K 7/08* (2006.01)
(52) U.S. Cl. ........................ 235/449; 235/450; 235/493
(58) Field of Classification Search ................ 235/449
See application file for complete search history.

(56) References Cited

U.S. PATENT DOCUMENTS 5,714,747 A * 2/1998 West et al. .................. 235/493

FOREIGN PATENT DOCUMENTS

| JP | 04-040583 | 2/1992 |
|----|-----------|--------|
| JP | 2001-283159 | 10/2001 |

* cited by examiner

*Primary Examiner*—Karl D. Frech
*Assistant Examiner*—Kristy A. Haupt
(74) *Attorney, Agent, or Firm*—Reed Smith LLP

(57) ABSTRACT

A reading method for data in a card reader including: (a) inserting a card provided with a magnetic stripe into a card insertion part, (b) reading data in the magnetic stripe with a data read section at least at a time of insertion or extraction of the card, (c) comparing an output level from the data read section with a predetermined read decision reference value, and then (d) changing the read decision reference value when the data have not been read. The read decision reference value may be changed from a low sensitivity setting to a high sensitivity setting or maybe circularly changed. The reading method for data is effectively utilized for a manual card reader.

6 Claims, 6 Drawing Sheets

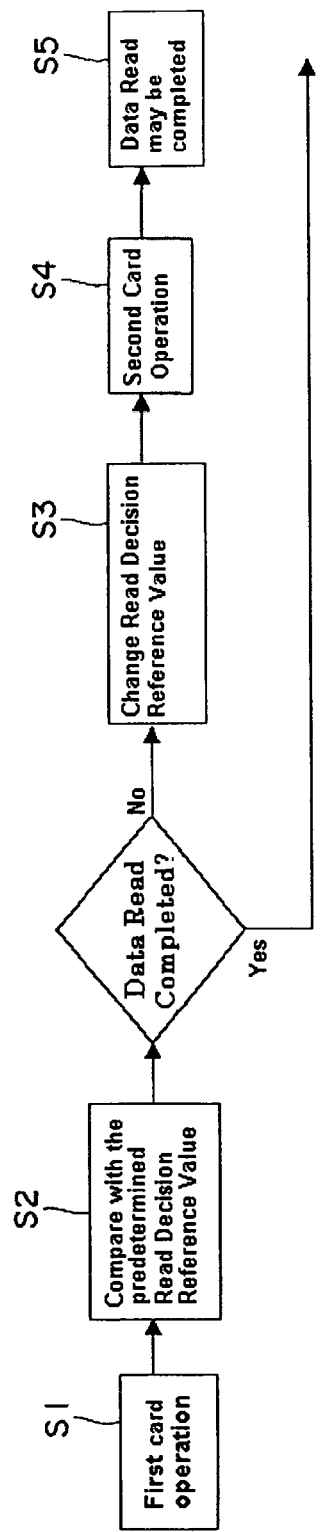
[Fig.1]

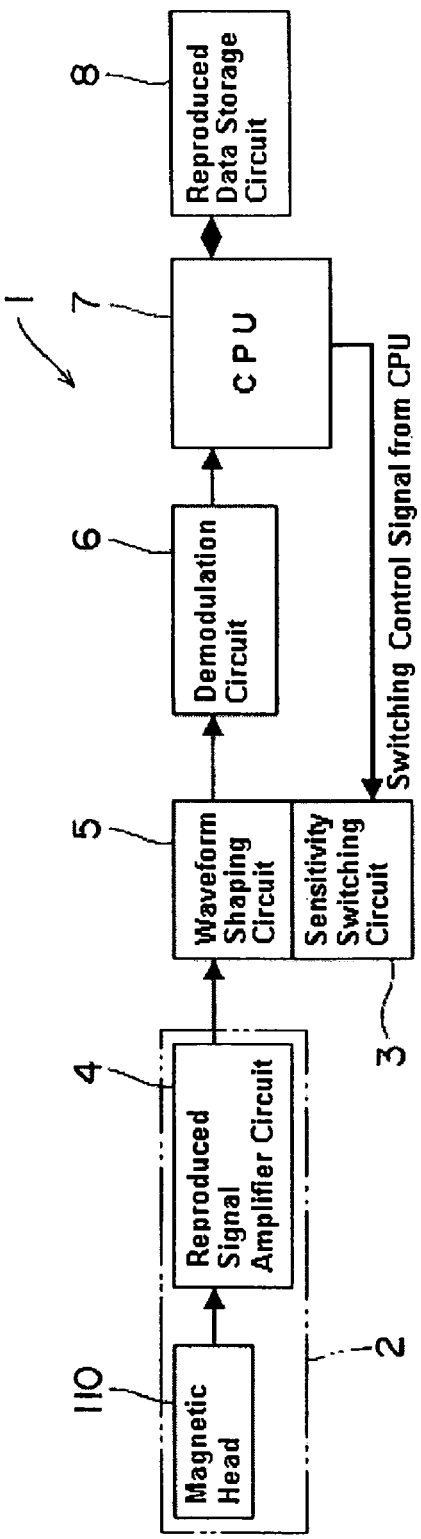
[Fig.2]

[Fig.3]
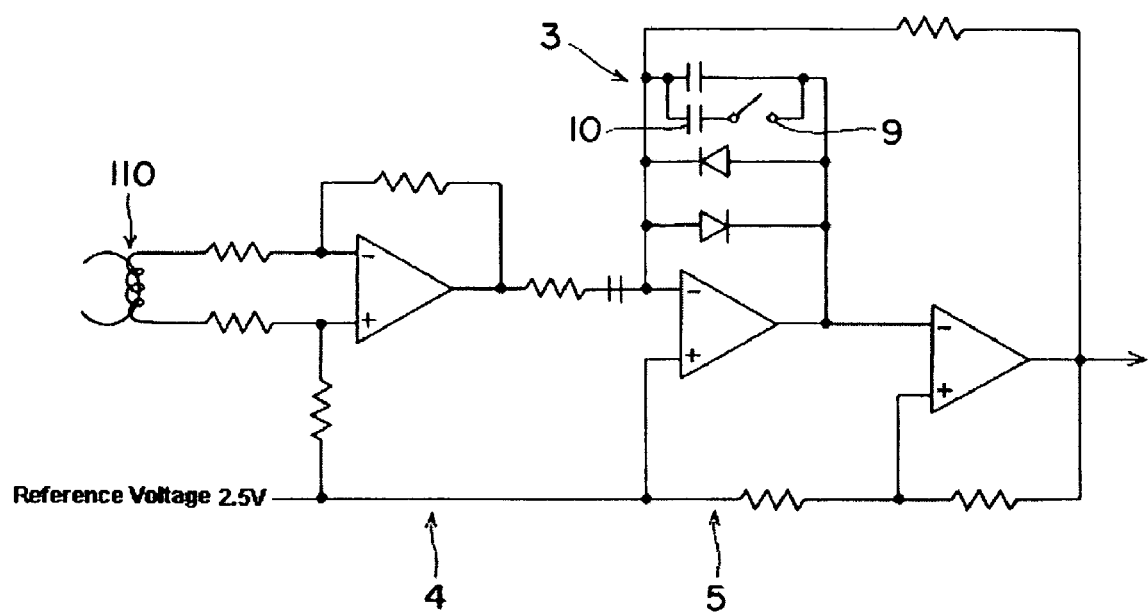

[Fig.4]
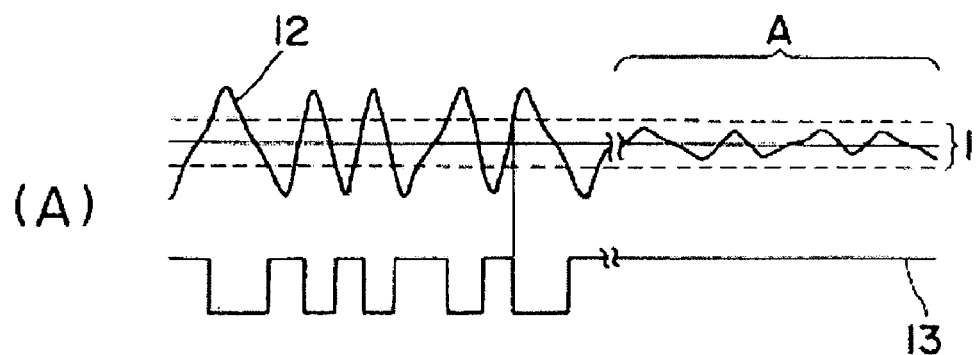
(A)
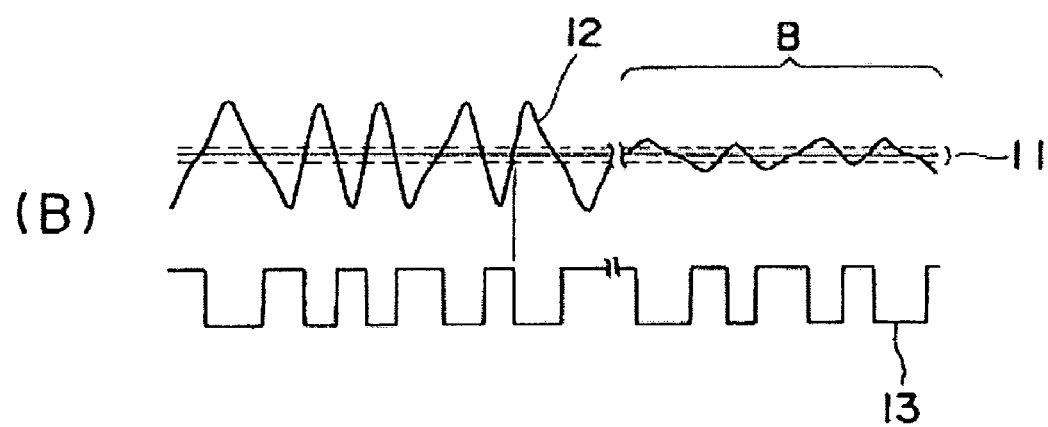
(B)

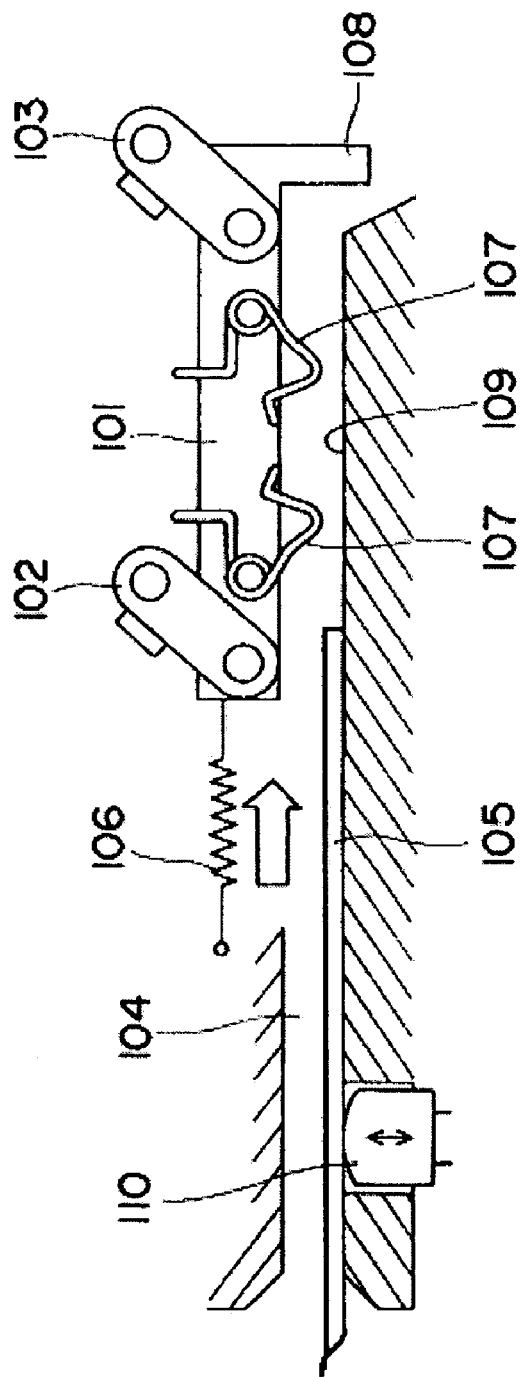
[Fig.5]

[Fig.6]
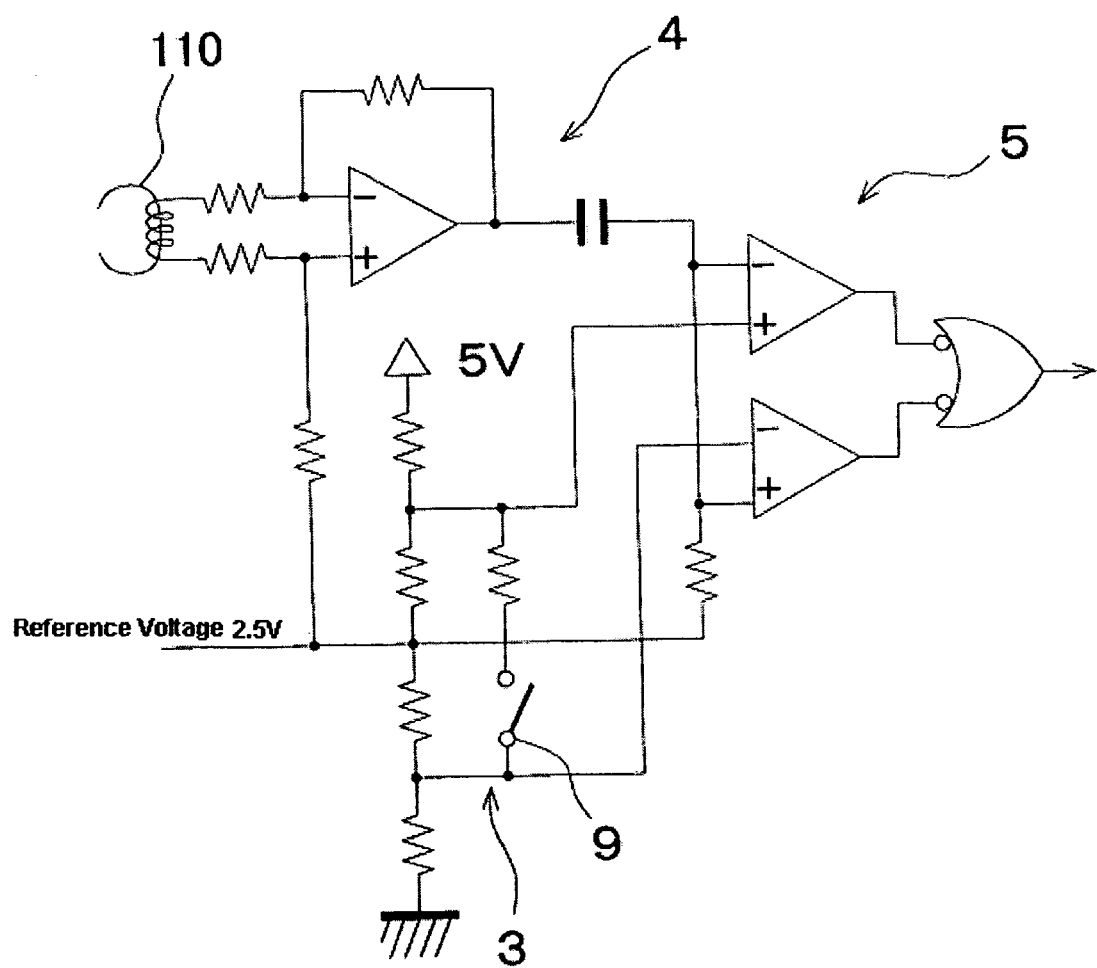

100
READING METHOD FOR DATA IN CARD READER AND CARD READER UTILIZING THE SAME

CROSS REFERENCE TO RELATED APPLICATIONS

This application claims priority to Japanese Application No. 2003-158582 filed Jun. 3, 2003, which is incorporated herein by reference.

FIELD OF THE INVENTION

The present invention relates to a card reader in which a card is manually moved to perform reading of magnetic data. More specifically, the present invention relates to a card reader in which a reading method for magnetic data is improved.

BACKGROUND OF THE INVENTION

A card reader of a manual system is known in which a card provided with a magnetic stripe is manually inserted into a card insertion part and, at the time of insertion or extraction of the card, magnetic data in the magnetic stripe is read by a data read section. In this type of card reader, the reading operation is not repeated because the reading operation of the manually-operated card reader is assumed to be performed only once. Therefore, only one read decision reference value is set in this type of manual card reader.

The read decision reference value is a reference value for judging the level of the read signal, that is, for deciding whether the read signal is at a level that is to be demodulated. For example, the read decision reference value is determined by the read peak detection sensitivity or the read signal slice level. When the read peak detection sensibility is enhanced or when the read signal slice level is decreased, it is effective for reading a demagnetized or bent card. However, these methods are overly sensitive to external noises and the reading of the card is easily affected by an adverse influence. On the contrary, when the read peak detection sensibility is lowered or when the read signal slice level is increased, the reading of the card is minimally affected by the external noises. But these methods are not preferable for reading a demagnetized or bent card. Accordingly, in consideration of these matters, that is, in correlative consideration of the noise and the output level of the read signal, the read decision reference value is determined on the basis of experience.

However, since the conventional card reader is provided with only one read decision reference value, no matter how many times tried the card still will not be able to be read even though the normal operation is performed. Therefore, the reading rate of magnetic data is not satisfactory.

SUMMARY OF THE INVENTION

In view of the problems described above, it is an object and advantage of the present invention to provide a card reader that can enhance the reading rate of magnetic data in a card.

In order to achieve the above object and advantage, according to the present invention, there is provided a reading method for data in a card reader including inserting a card provided with a magnetic stripe into a card insertion part, reading data in the magnetic stripe with a data read section at least at a time of insertion or extraction of the card, comparing an output level from the data read section with a predetermined read decision reference value, and changing the read decision reference value when the data cannot be read.

Further, in order to achieve the above object and advantage, according to the present invention, there is provided a card reader including a card insertion part into which a card provided with a magnetic stripe is inserted and extracted from, a data read section for reading data in the magnetic stripe at least at the time of insertion or extraction of the card, and a reference value changing means for changing a predetermined read decision reference value when the output level from the data read section is compared with the predetermined read decision reference value and the data cannot be read.

According to the construction described above, the read decision reference value is changed when the data cannot be read and thus the data may be read when the user inserts and extracts the card again. Therefore, the reading rate of the card can be enhanced in comparison with the conventional case where the read decision reference value is fixed.

In accordance with an embodiment of the present invention, the predetermined read decision reference value is normally set in at a low sensitivity. The predetermined read decision reference value is changed to a high sensitivity when the data of the card cannot be read. When the data still cannot be read, the changed read decision reference value maybe set in the low sensitivity again and, when the data further cannot be read again, the read decision reference value is set in the high sensitivity again. These settings maybe repeated. When a card is manually inserted into or extracted from the card insertion part, the card traveling conditions such as the speed and the variation of the speed may change. In the embodiment of the present invention, the read decision reference value requires only two values and thus the device can be simplified.

Further, in order to achieve the above object and advantage, according to another embodiment of the present invention, there is provided a reading method for data in a card reader including inserting a card provided with a magnetic stripe into a card insertion part, reading data in the magnetic stripe with a data read section at least at the time of insertion or extraction of the card and comparing an output level from the data read section with a read decision reference value. The read decision reference value is set beforehand so as to have a plurality of read decision reference values of different sensibilities and the plurality of read decision reference values are adopted circularly each time the card is read.

According to the construction described above, the read decision reference value is circularly changed between a plurality of sensitivity, for example, from the low sensitivity to the high sensitivity or vice versa irrespective of the reading result. Therefore, the reading of a card can be carried out without receiving an instruction from a host device.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIG. 1 is a flow chart showing an operation of a card reader in accordance with an embodiment of the present invention.

FIG. 2 is a schematic block circuit diagram of the card reader.

FIG. 3 is a circuit diagram showing a sensitivity changing circuit as a reference value changing means.

FIGS. 4(A) and 4(B) are respectively explanatory views showing the relationship between an output level from a data read section and the threshold value and the output of the data. FIG. 4(A) is the view of the low sensitivity and FIG. 4(B) is the view of the high sensitivity.

FIG. 5 is a schematic longitudinal sectional side view showing the card reader.

FIG. 6 is a circuit diagram showing a slice level changing circuit as the reference value changing means.

DETAILED DESCRIPTION OF THE PREFERRED EMBODIMENTS

A preferred embodiment of the present invention will be described in detail below with reference to the accompanying drawings.

FIGS. 2 through 5 show a card reader 1 in accordance with an embodiment of the present invention. The card reader 1 is constructed such that a card 105 provided with a magnetic stripe is manually inserted into a card insertion part and magnetic data in the magnetic stripe are read by a data read section 2 at least at the time of the insertion or the extraction of the card. In the card reader 1, the output level from the data read section 2 is compared with a predetermined read decision reference value. The card reader 1 is provided with a reference value changing means 3 for changing the read decision reference value when the data cannot be read.

The data read section 2 includes a magnetic head 110 for reading information from the magnetic stripe and a reproduced signal amplifier circuit 4 for amplifying a signal from the magnetic head 110. The card reader 1 is provided with the above-mentioned data read section 2 and reference value changing means 3, a waveform shaping circuit 5 that is connected to the reference value changing means 3 and shapes the waveform of a signal amplified by the reproduced signal amplifier circuit 4, a demodulation circuit 6 for demodulating the shaped signal, a CPU 7 for controlling the entire operation, and a storage circuit 8 for storing the reproduced data.

The reference value changing means 3 is a sensitivity switching circuit. An example of the reproduced signal amplifier circuit 4, the waveform shaping circuit 5 and the reference value changing means (circuit) 3 is shown in FIG. 3. In this example, when a sensitivity change-over switch 9 in the reference value changing means 3 is turned on, a capacitor 10 is connected to the circuit and a low sensitivity setting is obtained. On the other hand, a high-sensitivity setting is obtained when the sensitivity change-over switch 9 is turned off.

The low sensitivity setting is a state where the width 11 between two threshold values is large as shown in FIG. 4(A). The low sensitivity setting is suitable for use under a noisy environment or for reading the card containing a lot of noise. The high sensitivity setting is a state where the width 11 between two threshold values is small as shown in FIG. 4(B). The high sensitivity setting is suitable for reading a demagnetized card or for reading a bent or dusty card in which the magnetic reproduced output is low. Both the low sensitivity settings and the high sensitivity settings are respectively determined such that the magnetic data can be read when a normal card is used under the environment where the noise quantity is within a normal range.

The read decision reference value is normally set on low sensitivity. When the data cannot be read by the normal reading operation, the read decision reference value is changed to the high sensitivity setting. When the data cannot be read by the next reading operation again, the read decision reference value is changed to the low sensitivity setting again. After then, when the data cannot be read by a further reading operation, the read decision reference value is changed again. As described above, the high sensitivity setting and the low sensitivity setting are alternately set.

The card reader 1 in the embodiment of the present invention is an IC card reader 1 of a DIP type as shown in FIG. 5. In the card reader 1, a magnetic head 110 is disposed in the vicinity of a card insertion part. An inserted card 105 is pushed into an inner side while the magnetic data is read with the magnetic head 110. Then, the reading of the magnetic data is performed at the time of extraction of the card 105. In the embodiment of the present invention, the read decision reference value at the time of insertion is set to be the same as at the time of extraction of the card 105.

In order to bring IC contact springs into contact with contact terminal patterns of the IC card 105, an IC contact block 101 is supported by links 102 and 103 such that the IC contact springs are capable of protruding into a card traveling path 104. A stopper 108 is formed on the IC contact block 101 and abuts with the front end of the IC card 105 by the insertion of the IC card 105 to make the IC contact block 101 depressed. Therefore, the IC contact springs are brought into contact with the contact terminal patterns of the IC card 105.

The IC contact block 101 is pulled on the card insertion part side by a spring 106 and the inserted IC card 105 abuts with the stopper 108 to move the IC contact block 101 while the spring 106 is extended. Therefore, the IC contact block 101 gradually moves down as the IC card 105 moves and the IC contact springs 107 are brought into contact with the contact terminal patterns of the IC card 105. The IC card 105 is accurately positioned because the IC card 105 abuts with the stopper 108 of the IC contact block 101 and thus the IC contact springs 107 of the IC contact block 101 accurately come into contact with the contact terminal patterns of the IC card 105.

An example of an operation of the card reader 1 will be described below with the reference to the flow chart shown in FIG. 1.

A user performs a card reading operation (step 1: S1). The output level from the data read section 2 is compared with the read decision reference value which is set on low sensitivity (step 2: S2). When the output level 12 does not exceed the read decision reference value and does not exceed the width 11 of the threshold values (see the region "A" in FIG. 4(A)), the data cannot be read and the output value 13 becomes fixed. In this case, the read decision reference value is changed (step 3: S3). In other words, the sensitivity change-over switch 9 of the reference value changing means 3 is turned off and thus the read decision reference value is set on high sensitivity and the width 11 of the threshold values becomes smaller (FIG. 4(B)). Consequently, both the read decision reference values at the time of insertion and extraction of the card are changed to the high-sensitivity setting.

When the user performs a second reading operation because the data cannot be read in the first operation (step 4: S4), another read decision reference value different from that of the first operation is applied to read the data. Therefore, the possibility that the data is read from card 105 may be enhanced (step 5: S5). In other words, when the output level 12 at the time of the second reading operation comes out of the read decision reference values or exceeds the width 11 of the threshold values (see the region "B" in FIG. 4(B)), the data can be read to obtain the correct output value 13.

When the data still cannot be read by the second reading operation, the read decision reference value is changed back to the low sensitivity setting. Then, when the data still cannot be read again, the read decision reference value is changed again. The high sensitivity and the low sensitivity settings are alternately set. The reason for repeating the alternate settings in the high sensitivity and the low sensitivity when the data cannot be read is that the card reader in the embodiment of the present invention is a manually operated card reader in which a card is manually inserted into the card insertion part. The user may not perform the same operation as the former operation, and thus the data may be read from the card 105. Further, when the operation is not performed, for example, for 30 seconds, the read decision reference value is set to the initial value, i.e., the low sensitivity setting by judging that the next user is another person.

In addition, when the data has been read at the time of reading at or after the second operation, the read decision reference value is set to be on the low sensitivity setting and the next reading operation is performed even when the former read decision reference value is either the high sensitivity setting or the low sensitivity setting.

According to the card reader 1 described above, when the operation is not performed for a specified time period, the read decision reference value is set to the initial value. Therefore, the data can be read by the same read decision reference value for any user at the time of the first reading operation. Consequently, when the initial value of the read decision reference value is set to be the same as the conventional value, the reading rate can be improved without impairing the conventional reading performance.

The present invention has been described in detail using the preferred embodiment, but the present invention is not limited to the embodiment described above and many modifications can be made without departing from the present invention. For example, in the embodiment described above, the read decision reference value is changed when the data cannot be read. However, a plurality of read decision reference values of different sensitivities, for example, the read decision reference values with the low sensitivity and the high sensitivity may be set in advance and the plurality of read decision reference values may be circularly adopted. In this case, each time a card is read, the output level from the data read section is compared with a different read decision reference value. For example, in the case that two read decision reference values of the low sensitivity and the high sensitivity are set beforehand, the reading of a card may require at most that the card insertion operation is done twice by circularly changing the setting from the low sensitivity to the high sensitivity or from the high sensitivity to the low sensitivity.

In the embodiment described above, the reading is performed with the same read decision reference value at the time of the insertion and extraction of the card. However, the present invention is not limited to the embodiment and the different read decision reference values may be respectively used at the time of the insertion and the extraction of the card. For example, the low sensitivity is set for the first insertion of the card and the high sensitivity is set for the first extraction of the card, the high sensitivity is set for the next insertion and the low sensitivity is set for the next extraction, and for the third and succeeding operations, the settings for the first and second operations are repeated. The reading may be performed only at the time of insertion or extraction of the card.

Further, in the embodiment described above, the card reader 1 of a DIP type is used. However, the present invention is not limited to the embodiment and a card reader 1 of a swipe type may be used. In this case, for example, the low sensitivity is set for the first operation, the high sensitivity is set for the second operation, and for the third and succeeding operations, the settings for the first and second operations may be repeated.

In addition, in the embodiment described above, the read decision reference value is set in the initial value when read operation is not performed for 30 seconds. However, the waiting time period is not limited for 30 seconds and the length of the time period can be arbitrarily set. Alternatively, the read decision reference value may be changed to set in the initial value when the change of a user is detected by a sensor.

Further, in the embodiment described above, the read decision reference value is reset to the low sensitivity setting when the data have been read by the reading operation at the second or succeeding time. However, the read decision reference value when the data have been read may be used for the subsequent reading operation.

In the embodiment described above, the reference value changing means 3 is a sensitivity switching circuit. However, the present invention is not limited to the embodiment and the reference value changing means 3 may be constructed by a slice level changing circuit, for example, as shown in FIG. 6. In other words, a slice level is set with respect to the amplified waveform of a magnetic reproduced output to shape the waveform and the sensitivity is switched over by changing the value of the slice level. In the circuit shown in FIG. 6, when a sensitivity change-over switch 9 is turned on, the width of the slice levels becomes narrower and the high-sensitivity is obtained, and when the sensitivity change-over switch 9 is turned off, the width of the slice levels becomes wider and the low sensitivity is obtained.

In addition, in the embodiment described above, the reference value changing means 3 is constructed to include two read decision reference values but may include three or more read decision reference values.

As described above, in the reading method for data in the card reader or in the card reader in accordance with the embodiment of the present invention, when the data cannot be read, the read decision reference value is changed and thus the data may be read when a user tries to read the data again. Consequently, the reading rate of the card can be enhanced in comparison with the conventional case where the read decision reference value is not changed.

Further, in another reading method for data in the card reader in accordance with the embodiment of the present invention, the read decision reference value is circularly changed between a plurality of sensitivity, for example, from the low sensitivity to the high sensitivity or vice versa irrespective of the reading result. Therefore, the reading of the card can be carried out without receiving an instruction from a host device and thus the reading efficiency can be further enhanced.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A reading method for data in a card reader comprising:
   inserting a card provided with a magnetic stripe into a card insertion part;
   reading data in the magnetic stripe with a data read section at least at a time of insertion or extraction of the card;
   setting a predetermined read decision reference value normally in a low sensitivity setting; and then
   comparing an output level from the data read section with the predetermined read decision reference value; and then
   changing the predetermined read decision reference value to a high sensitivity setting when the data has not been read,
   setting the read decision reference value of the high sensitivity setting to the low sensitivity setting again when the data have not been read again; and then
   changing the read decision reference value to the high sensitivity setting again when the data have not been read again.

2. A reading method for data in a card reader comprising:
   inserting a card provided with a magnetic stripe into a card insertion part;
   reading data in the magnetic stripe with a data read section at least at a time of insertion or extraction of the card; and
   comparing an output level from the data read section with a read decision reference value;
   wherein the read decision reference value is set beforehand so as to include a plurality of read decision reference values of different sensibilities and the plurality of read decision reference values are used circularly each time the card is read.

3. A card reader comprising:
   a card insertion part into and from which a card provided with a magnetic stripe is inserted and extracted;
   a data read section for reading data in the magnetic stripe at least at a time of insertion or extraction of the card; and
   a reference value changing means for changing a predetermined read decision reference value when an output level from the data read section is compared with the predetermined read decision reference value and the data has not been read,
   wherein the reference value changing means includes a sensitivity change-over switch and a capacitor, and the connection of the capacitor is switched with the sensitivity change-over switch to change between a high sensitivity setting and a low sensitivity setting.

4. A card reader comprising:
   a card insertion part into and from which a card provided with a magnetic stripe is inserted and extracted;
   a data read section for reading data in the magnetic stripe at least at a time of insertion or extraction of the card; and
   a reference value changing means for changing a predetermined read decision reference value when an output level from the data read section is compared with the predetermined read decision reference value and the data has not been read,
   wherein the reference value changing means includes a sensitivity change-over switch, and a slice level with respect to a magnetic reproduced output is switched with the sensitivity change-over switch to change between a high sensitivity setting and a low sensitivity setting.

5. A method of reading data in a card reader, the method comprising the steps of:
   inserting a card having a magnetic stripe into a card insertion part;
   reading data in the magnetic stripe at least at a time of insertion or extraction of the card with a data read section;
   setting a predetermined read decision reference value normally in a low sensitivity setting;
   comparing an output level from the data read section with the predetermined read decision reference value;
   changing the predetermined read decision reference value to a high sensitivity setting when the data has not been read;
   setting the read decision reference value of the high sensitivity setting to the low sensitivity setting again when the data has not been read again; and
   changing the read decision reference value to the high sensitivity setting again when the data has not been read again.

6. A method of reading data in a card reader, the method comprising the steps of:
   inserting a card having a magnetic stripe into a card insertion part;
   reading data in the magnetic stripe at least at a time of insertion or extraction of the card with a data read section; and
   comparing an output level from the data read section with a read decision reference value;
   wherein the read decision reference value is set beforehand so as to include a plurality of read decision reference values of different sensibilities and the plurality of read decision reference values are rotatively used each time the card is read.

* * * * *